_3,109,739_
POTATO PRODUCTS AND PROCESS FOR MAKING SAME
Barney W. Hilton, Richardson, Tex., assignor to Frito-Lay, Inc.
No Drawing. Filed June 12, 1962, Ser. No. 201,751
9 Claims. (Cl. 99—100)

This invention relates to a potato product, and particularly to a deep fat fried potato product, which is of a completely homogeneous nature. This invention also relates to a process for making such products.

There are a great many disadvantages inherent in the methods presently employed in the processing of potatoes in the formation of commercial products such as potato chips or french fried potatoes. Many of these problems relate to the raw potato from which the product is made.

At the present time, potatoes are commonly cured by storing at temperatures of from 50–75° F. for periods up to three months for the purpose of sugar removal. This requires extensive storage facilities in which the temperature and humidity must be carefully controlled. Potatoes so stored tend to sprout to a considerable extent. This sprouting results in great economic loss due to shrinkage and the necessity for removing the sprouts prior to processing.

In the production of potato chips according to conventional techniques, after the potatoes have been stored as previously described to lower the sugar level, they are peeled, sliced into chips and washed prior to frying. Considerable loss of solids occurs during the slicing and washing operation due to the extremely large surface area of the chips. Commonly, this loss amounts to about 11% of the total solids.

It is well known that natural potatoes vary greatly in their composition, such as sugar content, solids content, flavor, etc. The extent of these variations are influenced by many factors such as the type of potatoes, the season when harvested, the area where grown, their culture during the growing season, the length of time they are stored prior to use, etc. These variations result in non-uniformity of products made from the potatoes. For example, it is known that the rate of browning of a potato product during processing such as deep fat frying is influenced by the reducing sugar content of the potato. Therefore, potato chips made from one potato may be much darker in color than those made from another potato due to the difference in reducing sugar content between the different potatoes. Similarly, the oil absorption rate of a potato product varies with the solids content of the potato. Generally, it has been found that for every 1% by weight decrease in solids content of the raw potato, the amount by weight of oil which the potato product is capable of absorbing increases by about 1½%. For example, when potato solids vary from 16 to 17% by weight, the amount of oil which the potato product will absorb will vary from 42½ to 41% by weight. This results in potato chips made from different potatoes having markedly different oil contents due to variances in solids content of the potatoes.

Moreover, individual potatoes are not of uniform composition. For example, each potato contains a layer, a fraction of an inch below the surface of the potato, which completely encloses the inner portion of the potato. This layer may be higher in reducing sugar content than any of the rest of the potato and the portion of the potato which is enclosed by this layer may be of a higher reducing sugar content than the portion of the potato lying immediately below the surface. Since the rate of browning on frying varies with the reducing sugar content, each potato chip may therefore have at least three distinct areas of different degrees of browning. Moreover, bruises result in localized areas of high reducing sugar concentrations. Consequently, bruised areas will generally result in unsightly dark spots on the chips when the chips are fried. Also, the inner portion of a natural potato has a lower solids content than does the outer portion. Therefore a chip sliced from a natural raw potato will, when fried, have areas of varying oil content due to the different rates of oil absorption in the areas of varying solids content.

It is an object of this invention to provide potato products of a completely homogeneous nature. It is another object of this invention to eliminate the necessity for storing raw potatoes for long periods of time prior to processing. It is a further object of this invention to avoid the high losses of potato solids generally associated with potato chip production.

It is still a further object of this invention to produce from fresh, raw potatoes, which may be of widely divergent compositions and characteristics, deep fat fried potato products, such as potato chips, which are of uniform color, texture, flavor, solids content and oil content. It is yet another object of this invention to provide a means for consistently producing potato chips having the same uniform characteristics.

These, and other objects, are accomplished by the practice of this invention which, briefly, comprises reducing the particle size of raw potatoes, which may have been previously peeled, sliced, washed and treated with an inhibiting agent to prevent enzymatic browning, to form a mixture of finely divided solids in liquid. Preferably, at least part of the liquid phase of the mixture is separated from the mixture. The solids portion, preferably after the addition of a gelling agent, is then formed into shaped bodies, such as chips, and the shaped bodies are then cooked as by frying in deep fat.

According to the practice of this invention, potatoes of different varieties, size and compositions may be used as starting materials. They are generally first peeled, sliced into smaller pieces, and washed by techniques well known to the art. The size of the pieces into which the potatoes are sliced is not critical but varies generally between ¼ to 1 inch in diameter. The optimum size of these pieces will depend on the type of apparatus which will be used to reduce the particle size to form the mixture of finely divided solids in liquid. If the potato pieces are to be stored for any length of time at any point prior to the completion of the operation, or if subjected to a current of air during the grinding operation, they should be treated with a suitable inhibiting agent, such as by dipping them in a dilute solution of sodium bisulfite or sulfurous acid, to prevent enzymatic browning. Such treatment is wholly conventional and does not constitute a part of this invention.

The potato pieces are then subjected to a treatment which reduces the particle size of the potatoes. This treatment ruptures a portion of the starch cells in the potato and releases the liquid contained in the starch granules or parenchyma cells. The amount of liquid released increases as the particle size decreases. A mixture of finely divided solids and liquid, or a puree, is thereby formed. The maximum particle size of the solids in the mixture should not be greater than that which may be accommodated during subsequent operations. For example, if the material is to be subsequently extruded to form potato chips, no particles should be of a larger diameter than the orifice through which they must be extruded—i.e., if the orifice is 0.035 inch thick, no particle should have a diameter greater than 0.035 inch. The particles may be either uniform or random in size.

Reduction of the particle size of the potatoes may be accomplished in any apparatus which will cut or shear the potatoes into fine particles. Crushing of the potatoes should be avoided since this results in the formation of a "stringy" pulp and adversely affects the flavor and texture of the final products. It is preferred to avoid high temperatures in the formation of the puree since high temperatures may adversely affect the flavor characteristics of the product. A Fitzpatrick mill may be used to reduce the particle size of the potatoes. Particularly good results have been obtained by the use of an Urschel cutting mill which reduces the particles size to from about 0.01 to 0.02 inch in diameter.

After the particle size of the potatoes has been reduced to form a mixture of finely divided solids and liquid, it is preferred to separate at least part of the liquid from the mixture. Generally, from about 40 to about 80%, and preferably from about 47 to 53%, by weight of the mixture of finely divided solids and liquid is removed in the separation step as liquid. In a preferred embodiment of this invention, about 50% by weight of the puree is removed as liquid. The separation of the liquid may be accomplished by means of a centrifuge, a screw press or by means of filtration. Considerable savings can be made in transportation costs if this portion of the process is performed at or near the growing location of the potatoes. Only the finely divided solids phase need then be shipped to the manufacturer of the final product.

The liquid fraction of the puree contains a major portion of the reducing sugar and amino acids content which was originally present in the potatoes. The extent of removal of these constituents will depend upon the amount of liquid separated from the mixture of finely divided solids and liquid. It is generally desirable to remove sufficient liquid to lower the reducing sugar content of the finely divided solids phase to below 0.2%, and preferably below 0.15%, by weight of the total weight of the finely divided solids phase. If sufficient liquid cannot be removed from the mixture to reduce the reducing sugar content to the desired level, the reducing sugar content may be further lowered by washing the solids with water. By thus controlling the reducing sugar content of the solids phase, the extent of browning of the final product may also be controlled.

By controlling the amount of liquid removed from the mixture of finely divided solids and liquid, the solids content of the finely divided solids phase and, therefore the oil absorption of the final product is also regulated. After separation of the liquid, if the solids content of the finely divided solid phase is still too low, it may be increased by the addition of a small amount of dehydrated potatoes. Conversely, if the solids content is too high, it may be lowered by the addition of liquid such as a portion of the liquid previously removed. Moreover, different batches of finely divided solids having different solids content may be combined. The finely divided solids phase may have a solids content as low as about 30% or as high as about 90% prior to admixing it with a gelling agent and forming it into shaped bodies. It is preferred that the finely divided solids phase have a solids content of 36 to 42% by weight at this stage of the operation.

Before any of the separated liquid is returned to the solids phase to lower the solids content, it may first be treated to remove the reducing sugars and/or amino acids contained therein. Since heat browning does not occur unless both amino acids and reducing sugars are present, it is not absolutely necessary to remove both of these constituents. However, concentrations of sugar above about 0.5% by weight may impart a bitter flavor to the final product. Therefore, from the standpoint of flavor, it is generally desired to remove high concentrations of sugar from the liquid before it is returned to the solids. The reducing sugars content of the liquid may be removed by means of any of the standard methods which are known to remove sugar from liquids such as by fermentation, or enzymatic oxidation. The amino acids may be removed from the liquid by passing the liquid through a suitable ion exchange column.

The liquid which is separated from the mixture of finely divided solids and liquid contains a substantial proportion of the coagulable protein content of the original potatoes. The proteins contain nutrient as well as flavor value. Therefore, it is frequently desirable to return them to the finely divided solids phase. If the separated liquid is not to be returned to the solids, then the proteins may be recovered from the liquid such as by heat coagulation. Thus, if the liquid is heated to a temperature between 145° and 165° F., or if the liquid is flashed at a higher temperature for a short period of time, the proteins will coagulate and precipitate. They may then be recovered by filtration and returned to the finely divided solids.

Various additives may be mixed with the finely divided solids phase before it is formed into shaped bodies and fried. It is preferred to add a gelling or stiffening agent to the solids such as a cellulose derivative (e.g., methyl cellulose and carboxymethyl cellulose), starches (either cold gelling or hot gelling), agar, or other ingestible colloidal materials. A mixture of gelling agents may be, and generally is, used. The addition of a gelling agent to the finely divided solids imparts to the mixture the proper consistency, elasticity and viscosity to facilitate subsequent processing such as sheeting or extruding. Moreover, when a shaped body of the mixture is deep fat fried, it does not break up in the hot fat as it might in the absence of a gelling agent. Furthermore, the addition of gelling agents to the finely divided solids results in the final product being of improved texture. Methyl cellulose is particularly desirable since it makes the final products more tender. The total amount of gelling agents added should generally not exceed 10% by weight of the finely divided solids phase.

Other constituents may also be added to improve the flavor, color or other properties of the final product. Among the optional ingredients which may be included there may be mentioned gluten, soy flour, lecithin, fats, sugars, monosodium glutamate, hydrolized vegetable protein and other spices, seasonings and flavorings.

The particular method of mixing the additives with the finely divided solids phase is not critical. For ease of mixing however, it is preferred to premix all of the additives and then add the premixed additives to the finely divided solids phase.

The mixture of gelling agent and finely divided solids phase possesses the property of becoming less viscous (more fluid) upon standing. After 60 to 90 minutes, the dough becomes too fluid to handle properly. This property does not manifest itself when the dough is being agitated. Therefore, the dough should either be used shortly after it is prepared or it should be stirred continuously until it is ready for use.

The finely divided solids phase, preferably in admixture with a gelling agent is formed into shaped bodies by any suitable means. For example, the mixture of finely divided solids phase and gelling agent may be rolled into a sheet, cut into pieces of the desired shape and fried to form potato chips, french friend potatoes, shoestring potatoes, etc. Alternatively, the desired potato products may be formed by extruding shaped bodies directly into a frying machine. In a preferred embodiment of this invention, a mixture of finely divided solids phase, gelling agents and other additives is extruded through a variable orifice extrusion die to form round or oval shaped chips which are dropped directly into a continuous frying machine.

Any conventional apparatus which is ordinarily used for deep fat frying may be employed to cook the potato products of this invention. The frying may be accomplished by means of a batch operation, in which a batch of shaped potato bodies are charged directly into the cooker, agitated and then removed. For most efficient operation, however, a continuous frying method is preferred. In a continuous frying process, the potato bodies, such as chips, are fed into one end of a cooker and are continuously removed from the other end.

The type and temperature of fat or oil used to cook the chips are those conventionally used in deep fat frying potato chips. There may be used, for example, cottonseed oil, peanut oil, corn oil, soybean oil, mixtures of any of these or coconut oil. The temperature in the cooker generally varies between about 320° F. and 375° F.

Although as described hereinabove, a portion of the liquid is preferably separated from the mixture of finely divided solids and liquid, a product may be formed from the puree without the removal of any liquid by the addition to the puree of up to 10% by weight of the puree of a gelling agent or by slightly heating to gel the native starches in the potato. These embodiments may be practiced when the sugar content of the raw potato is below the maximum tolerable limit (i.e., below about 0.2% by weight) such as sometimes occurs in freshly dug potatoes. Other constituents, such as those listed above, may be added to improve the flavor, color and other properties of the final product. The composition is then formed into shaped bodies and cooked as described hereinabove.

Products obtained in accordance with the practice of this invention, such as potato chips, are characterized by reasonable uniformity of color, flavor, texture, oil content, size, etc., both within each individual chip and between all of the chips. Moreover, potato chips made in accordance with this invention are more rigid than and do not break as easily as chips made by conventional processes and, therefore, are more satisfactory for use with creamed dips. The products of this invention are also denser, retain their crispness well, are less porous and have firmer texture than potato products which are presently known. The products of this invention also have an elegant flavor.

The following examples illustrate the best modes contemplated for carrying out this invention.

Example 1

Potatoes (1000 parts by weight), of varying sizes and grades and of the cobbler variety, were peeled, sliced into pieces about ¼ inch x ¼ inch x 1 inch, washed, treated with a 0.3% by weight aqeous sodium metabisulfite solution, and put through an Urschel rotary cutting mill. The blades on the head of the mill were spaced about 0.02 inch apart and the impeller was rotated at a speed of about 7200 r.p.m. A mixture of finely divided solids in liquid was formed. The maximum particle size of the solids in the mixture was 0.02 inch in diameter. About 50% by weight of the mixture was removed as liquid in a centrifuge. The remaining finely divided solids phase was a white, soft material which still contained a substantial amount of water. However, it would not hold together when stretched or rolled and was unsuitable for extrusion. It possessed low elasticity. A premix, consisting of 25 parts by weight of pregelatinized wheat starch, 5 parts by weight of waxy maize starch (Instant Clearjel), 3 parts by weight of methyl cellulose (viscosity of 15,000 cps.; gels at 90° C.), one part by weight of reducing sugar, and one part by weight of monosodium glutamate, was added to 500 parts by weight of the finely divided solids phase and the composition was mixed at slow speed for 2½ minutes in a large Hobart mixer. The resultant mixture was stiffer, more elastic and held together better than did the finely divided solids phase. The mixture was given a surface application of oil and was charged to the hopper of a pump extruder which was equipped with a die having an extrusion orifice of varying width and a thickness of 0.035 inch. The mixture was extruded as round chips directly into moving oil in a continuous cooker. The oil in the cooker was held at a temperature of about 330° F. and the residence time of each chip in the cooker was about 3 minutes. An application of salt was put on the chips as they were removed from the cooker. All of the chips were of a uniform light golden brown color and had a uniform oil content. They were very tender, possessed a delectable flavor, and retained their crispness for a long period of time.

Example 2

The process of Example 1 was repeated except that 60% by weight of the mixture of finely divided solids and liquid was removed as liquid. The separated liquid was heated to about 160° F. to coagulate the protein and other coagulable material which was then recovered by filtration and added back to the finely divided solids phase. The finely divided solids phase was then processed as described in Example 1. The resultant chips possessed excellent color and flavor.

Example 3

The process of Example 1 was repeated except that 65% by weight of the mixture of finely divided solids and liquid was removed as liquid. The separated liquid was recovered and 0.025% by weight of glucose-oxidase (DeeO) buffered to pH 7.7 was added thereto. The mixture was allowed to stand at room temperature until the reducing-sugar content of the liquid had been decreased 2½ fold. Sufficient treated liquid was then added back to the finely divided solids phase to give a solids content of about 36% by weight. The solids phase was then processed as described in Example 1. The resultant chips possessed excellent color and flavor.

Example 4

The process of Example 1 was repeated except that 55% by weight of the mixture of finely divided solids and liquid was removed as liquid and the liquid was recovered. The liquid was run through a vertical ion exchange column containing an anion exchange resin (Amberlite IRH–400, quaternized chloromethlated polystyrene) to remove the amino acid content of the liquid. Sufficient effluent from the column was returned to the finely divided solids phase to give a solids content of 42%. The solids phase was then processed as described in Example 1. The resultant chips were very light in color.

Example 5

Freshly cut Kennebec potatoes (500 parts by weight), having a sugar content of about 0.15% by weight, were peeled, sliced into pieces of about ¼ inch x ¼ inch x 1 inch, washed, treated with a 0.3% by weight aqueous solution of sodium metabisulfite and put through an Urschel rotary cutting mill. The width of the slits in the head was about 0.020 inch and the impeller was rotated at a speed of about 7200 r.p.m. To the puree which was thereby formed there was added a premix of 50 parts by weight of pregelatinized wheat starch, 10 parts by weight of waxy maize starch, 6 parts by weight of methyl cellulose, 2 parts by weight of reducing sugar and 2 parts by weight of monosodium glutamate. The composition was mixed in a large Hobart mixer for about 3 minutes. It was then extruded through a variable orifice extrusion die having a slit width of about 0.04 inch as a round chip into a cooker. The oil in the cooker was held at a temperature of about 340° F. and the residence time of each chip in the cooker was about 2½ minutes. All of the chips were completely homogeneous in color, flavor and texture.

Example 6

A potato puree was prepared by grinding peeled potatoes in a Fitzpatrick comminuter. The puree was cast as chips onto a Teflon belt and was heated by means of infrared radiation for 3 to 4 minutes to gel the native starch. The material was then submerged on the belt directly into frying fat. After a few seconds, the chips separated from the belt and the frying was continued. The resulting chips were crisp and had a fried potato flavor.

I claim:

1. A process for producing a fried potato product which comprises reducing the particle size of raw potatoes to form a mixture of finely divided solids and liquid, separating from said mixture from about 40 to about 80% by weight of said mixture as liquid, forming an admixture of said finely divided solids and up to 10% by weight of said finely divided solids of an ingestible gelling agent, forming said admixture into shaped bodies, and subsequently frying said shaped bodies.

2. A process for producing a potato product which comprises reducing the particle size of raw potatoes to form a mixture of finely divided solids and liquid, separating sufficient liquid from said mixture to bring the solids content of said mixture to from 36 to 42% by weight, forming the solids into shaped bodies, and subsequently frying said shaped bodies.

3. A process according to claim 1 wherein said bodies are fried in deep fat.

4. A process according to claim 1 wherein about 50% by weight of the mixture of finely divided solids and liquid is removed as liquid.

5. A process according to claim 1 wherein said separated liquid is recovered, treated to remove the reducing sugars content, and sufficient of said treated liquid is returned to the finely divided solids to bring the solids content to from 36 to 42% by weight.

6. A process according to claim 1 wherein said separated liquid is recovered, treated to remove the amino acids content, and sufficient of said treated liquid is returned to the finely divided solids to bring the solids content to from 36 to 42% by weight.

7. A process according to claim 1 wherein said separated liquid is recovered, treated to recover the protein content and said protein content is returned to the finely divided solids.

8. A process according to claim 1 wherein at least a portion of said gelling agent is methyl cellulose.

9. A process according to claim 1 wherein at least one flavoring agent and at least one seasoning agent are added to said admixture.

References Cited in the file of this patent

UNITED STATES PATENTS

| | | |
|---|---|---|
| 2,176,347 | Jansen | Oct. 17, 1939 |
| 2,783,154 | Rivoche | Feb. 26, 1957 |
| 2,791,508 | Rivoche | May 7, 1957 |
| 2,856,295 | Scharf | Oct. 14, 1958 |
| 3,085,020 | Backinger et al. | Apr. 9, 1963 |

OTHER REFERENCES

Talbert et al.: "Potato Processing," pages 444–445, published by The Avi Publishing Co., Westport, Conn., 1959.